United States Patent
Takahashi et al.

(10) Patent No.: US 7,754,806 B2
(45) Date of Patent: Jul. 13, 2010

(54) BIOLOGICAL SUBSTANCE RELATED ARTICLE AND METHOD OF MANUFACTURING THE SAME, AND BIOLOGICAL SUBSTANCE ADSORPTION PREVENTIVE COATING COMPOSITION AND METHOD OF USING THE SAME

(75) Inventors: Masayuki Takahashi, Chuo-ku (JP); Kinji Yamada, Chuo-ku (JP); Toshihiro Ogawa, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 12/437,790

(22) Filed: May 8, 2009

(65) Prior Publication Data
US 2009/0221743 A1 Sep. 3, 2009

Related U.S. Application Data

(62) Division of application No. 11/268,585, filed on Nov. 8, 2005, now Pat. No. 7,569,622.

(30) Foreign Application Priority Data
Nov. 9, 2004 (JP) .............................. 2004-324930

(51) Int. Cl.
*C09D 5/16* (2006.01)
(52) U.S. Cl. ...................... 524/507; 523/122; 428/35.2; 428/35.7; 428/36.91
(58) Field of Classification Search ................. 524/507; 523/122; 428/35.2, 35.7, 36.91
See application file for complete search history.

(56) References Cited

U.S. PATENT DOCUMENTS

| 4,048,136 A | 9/1977 | Kobayashi et al. |
| 4,769,400 A | 9/1988 | Geist et al. |
| 5,331,052 A | 7/1994 | Jung |
| 5,412,035 A | 5/1995 | Schmitt et al. |
| 6,203,900 B1 | 3/2001 | Saika et al. |
| 6,797,391 B2 | 9/2004 | Shibato et al. |

FOREIGN PATENT DOCUMENTS

| EP | 1 156067 | 11/2001 |
| EP | 1 192 959 | 4/2002 |
| JP | 9-12904 | 1/1997 |
| JP | 9-183819 | 7/1997 |
| JP | 2806510 | 7/1998 |
| JP | 2000-279512 | 10/2000 |
| JP | 2001-323030 | 11/2001 |
| JP | 2002-105136 | 4/2002 |

OTHER PUBLICATIONS

Masaru Tanaka, et al., "Blood compatible aspects of poly(2-methoxyethylacrylate) (PMEA)—relationship between protein adsorption and platelet adhesion on PMEA surface", Biomaterials, XP004199068, vol. 21, No. 4, Jul. 2000, pp. 1471-1481.

*Primary Examiner*—Bernard Lipman
(74) *Attorney, Agent, or Firm*—Oblon, Spivak, McClelland, Maier & Neustadt, L.L.P.

(57) ABSTRACT

A biological substance related article includes a coating formed by causing a biological substance adsorption preventive coating composition to come in contact with a surface of the biological substance related article and heating the composition, the biological substance adsorption preventive coating composition including: (A) a copolymer obtained by copolymerizing raw material monomers including a monomer A1 shown by the following general formula (1) and an active hydrogen group-containing monomer A2; (B) a crosslinking agent reactive with an active hydrogen group; and (C) a solvent.

$$CH_2=CR^3COOR^1OR^2 \qquad (1)$$

($R^1$ represents an alkylene group having 1 to 4 carbon atoms, $R^2$ represents an alkyl group having 1 to 4 carbon atoms, and $R^3$ represents a hydrogen atom or a methyl group).

9 Claims, No Drawings

BIOLOGICAL SUBSTANCE RELATED ARTICLE AND METHOD OF MANUFACTURING THE SAME, AND BIOLOGICAL SUBSTANCE ADSORPTION PREVENTIVE COATING COMPOSITION AND METHOD OF USING THE SAME

Japanese Patent Application No. 2004-324930, filed on Nov. 9, 2004, is hereby incorporated by reference in its entirety.

BACKGROUND OF THE INVENTION

The present invention relates to a biological substance related article exhibiting low biological substance adsorption and a method of manufacturing the same, and a biological substance adsorption preventive coating composition and a method of using the same.

In the field of biochemical assays, separation and purification of biological substances such as protein, and medical treatment, there have been used many kind of articles such as reaction vessel, centrifuging tube, tube, syringe, pipet, filter, separation column, artificial organ, blood circuit, pump oxygenator circuit, containers, instruments, and devices. And these articles are formed by using a material such as polystyrene, polypropylene, polyethylene, polyurethane, nylon, polyvinyl chloride, glass, stainless steel, and aluminum.

However, since such a material adsorbs a large amount of biological substance such as protein, it may decrease the detection sensibility or reproducibility in medical treatment and biochemical assays. When separating and purifying a biological substance such as protein, the biological substance may adhere to a container used for purification or the like to decrease the yield and the purity of the target biological substance or the like.

In order to solve these problems, a method of adding a polyoxyethylene-based nonionic surfactant, another protein having known properties, a carbohydrate, or a lipid to a test sample has been known. However, when the surfactant is added to the test sample, the biological substance such as protein may be modified and denatured. Moreover, since it is necessary to add a large amount of protein, carbohydrate, lipid, or the like, the purity of the target biological substance may be decreased.

As another method for preventing adsorption of the biological substance such as protein, a method of applying a coating of a polymer containing polymethoxyethyl acrylate as the major component has been proposed (Japanese Patent No. 2806510, JP-A-2001-323030, and JP-A-2002-105136). However, since the polymer containing polymethoxyethyl acrylate as the major component exhibits high adhesion, a contaminant in air tends to adhere to the coating of the polymer. Moreover, the strength and water resistance of the coating are insufficient. Furthermore, the polymer may exhibit an insufficient biological substance adsorption preventive effect.

As a coating agent for preventing adsorption of a biological substance such as protein, a copolymer having a phospholipid type structure has been proposed (JP-A-9-12904, JP-A-9-183819, and JP-A-2000-279512). However, the copolymer having a phospholipid type structure is expensive since a special monomer is used. Moreover, the copolymer may exhibit an insufficient biological substance adsorption preventive effect.

SUMMARY

The invention may provide a biological substance related article which is used for separation and purification of a biological substance such as protein or nucleic acid in the field of medical treatment and biochemical assays, reduces adsorption of the biological substance, allows a contaminant to adhere to only a small extent, exhibits excellent water resistance and strength, and is inexpensive, a method of manufacturing the same, a biological substance adsorption preventive coating composition used for the article, and a method of using the same.

A biological substance related article according to a first aspect of the invention comprises a coating formed by causing a biological substance adsorption preventive coating composition to come in contact with a surface of the biological substance related article and heating the composition, and the biological substance adsorption preventive coating composition includes:

(A) a copolymer obtained by copolymerizing raw material monomers including a monomer A1 shown by the following general formula (1) and an active hydrogen group-containing monomer A2, $$CH_2=CR^3COOR^1OR^2 \qquad (1)$$

wherein $R^1$ represents an alkylene group having 1 to 4 carbon atoms, $R^2$ represents an alkyl group having 1 to 4 carbon atoms, and $R^3$ represents a hydrogen atom or a methyl group;

(B) a crosslinking agent reactive with an active hydrogen group; and (C) a solvent.

With this biological substance related article, the monomer A1 may be a methoxyalkyl (meth)acrylate.

With this biological substance related article, the active hydrogen group of the monomer A2 may be a hydroxyl group, a carboxyl group, an amino group, or a mercapto group.

With this biological substance related article, the monomer A2 may be a hydroxyl group-containing (meth)acrylate.

With this biological substance related article, the crosslinking agent (B) may be a non-aromaticpolyisocyanate.

A biological substance adsorption preventive coating composition according to a second aspect of the invention is used to manufacture the above biological substance related article, and includes:

(A) a copolymer obtained by copolymerizing raw material monomers including a monomer A1 shown by the following general formula (1) and an active hydrogen group-containing monomer A2, $$CH_2=CR^3COOR^1OR^2 \qquad (1)$$

wherein $R^1$ represents an alkylene group having 1 to 4 carbon atoms, $R^2$ represents an alkyl group having 1 to 4 carbon atoms, and $R^3$ represents a hydrogen atom or a methyl group;

(B) a crosslinking agent reactive with an active hydrogen group; and (C) a solvent.

With this biological substance adsorption preventive coating composition, the monomer A1 may be a methoxyalkyl (meth)acrylate.

With this biological substance adsorption preventive coating composition, the active hydrogen group of the monomer A2 may be a hydroxyl group, a carboxyl group, an amino group, or a mercapto group.

With this biological substance adsorption preventive coating composition, the monomer A2 may be a hydroxyl group-containing (meth)acrylate.

With this biological substance adsorption preventive coating composition, the crosslinking agent (B) may be a non-aromatic polyisocyanate.

A method of manufacturing a biological substance related article according to a third aspect of the invention causes the above biological substance adsorption preventive coating composition to come in contact with a surface of an article and heating the composition to form a coating on the surface.

A method of using a biological substance adsorption preventive coating composition according to a fourth aspect of the invention comprises causing the above biological substance adsorption preventive coating composition to come in contact with a surface of an article and heating the composition to form a coating on the surface.

Since the above biological substance related article includes the coating formed by using the above biological substance adsorption preventive coating composition on the surface, the biological substance related article has low protein adsorption, allows a contaminant to adhere to only a small extent, is inexpensive, and exhibits excellent strength and water resistance.

According to the above biological substance adsorption preventive coating composition, the surfaces of various articles (e.g. parts, containers, instruments, devices, and systems) used for separation and purification of a biological substance in the field of medical treatment and biochemical assays can be coated without using a special and expensive monomer such as a monomer having a phospholipid type structure, so that a coating which allows a contaminant to adhere to only a small extent, is inexpensive, exhibits excellent strength and water resistance, and has low protein adsorption can be formed.

Since the above method of manufacturing a biological substance related article includes causing the biological substance adsorption preventive coating composition to come in contact with the surface of the article and heating the composition, a coating which allows a contaminant to adhere to only a small extent, is inexpensive, and has low biological substance adsorption can be formed by using a simple method.

Since the above method of using a biological substance adsorption preventive coating composition includes causing the biological substance adsorption preventive coating composition to come in contact with the surface of the article and heating the composition to form a coating on the surface, a coating which allows a contaminant to adhere to only a small extent, is inexpensive, exhibits excellent strength and water resistance, and has with low biological substance adsorption can be formed by using a simple method.

DETAILED DESCRIPTION OF THE EMBODIMENT

A biological substance related article and a method of manufacturing the same, and a biological substance adsorption preventive coating composition and a method of using the same according to the invention are described below in detail.

1. Biological Substance Related Article

A biological substance related article according to the invention includes a coating formed by causing a biological substance adsorption preventive coating composition according to the invention described later to come in contact with the surface of the article and heating the composition.

The "biological substance" used in the invention refers to any substance related to a living body. As the biological substance, a substance contained in a living body, a substance derived from a substance contained in a living body, and a substance which can be utilized in a living body can be given.

The biological substance used in the invention is not particularly limited. As specific examples of the biological substance, protein (e.g. enzyme, antibody, aptamer, and receptor), peptide (e.g. glutathione), nucleic acid (e.g. DNA and RNA), carbohydrate, lipid, and other cells or substances (e.g. blood substances including blood cells such as a platelet, red cell, and leukocyte, and floating cells) can be given.

The "biological substance related article" used in the invention refers to an article which may contact the biological substance. In more detail, the "biological substance related article" refers to an article having a surface which may contact the biological substance. The biological substance related article according to the invention is not particularly limited. It is preferable that the biological substance related article exhibit high biocompatibility and low biological substance nonspecific adsorption.

As specific examples the biological substance related article according to the invention, various parts, containers, instruments, devices, and systems used in the biomedical field or the life science field can be given. For example, a container, instrument, device, and system used for biological assays, separation or purification of protein, or cell culture or separation, a biological substance storage container, centrifuging tube, tube, syringe, pipet, filter, separation column, artificial organ (e.g. artificial lung, artificial heart, artificial anus, artificial kidney, artificial valve, artificial joint, artificial blood vessel), hemodialysis device, blood circuit, pump oxygenator circuit, injection needle, stent, cannula, catheter, and the like can be given.

In particular, the biological substance related article according to the invention preferably has a section (surface) with which a liquid containing a biological substance such as blood or urine comes in contact.

The biological substance related article according to the invention includes a single material or includes a plurality of materials in combination. As examples of such a material, plastic such as polystyrene, polypropylene, polyethylene, polyurethane, nylon, polyvinyl chloride, polybutadiene, polyethylene vinyl acetate resin, polyethylene vinyl resin, polyacrylonitrile resin, polymethyl methacrylate resin, AS resin, ABS resin, AAS resin, polyamide resin, polycarbonate, polyethylene terephthalate, polyethylene naphthalate, aliphatic polyester, polylactic acid, polyglycolic acid, aliphatic polyamide, alicyclic polyamide, cycloolefin, polymethylpentene, polyvinyl chloride, polyvinyl acetate, polyallylate, polysulfone, polyethersulfone, polyimide, triacetylcellulose, cellulose acetate resin, nitrocellulose resin, epoxy resin, polytetrafluoroethylene, fluorinated ethylene-polypropylene copolymer, tetrafluoroethylene perfluoroalkoxy vinyl ether copolymer, polyvinylidene fluoride, polyvinyl fluoride, and silicone resin, inorganic materials such as glass and ceramics, and metals such as steel, stainless steel, and aluminum can be given. These materials have various surface properties and surface states.

When forming a coating on the surface of the article by using the coating composition according to the invention, a known pretreatment such as washing, grinding, blasting, degreasing, plating, chemical treatment, corona discharge treatment, or primer treatment may be performed so that repelling, separation, or the like does not occur.

2. Biological Substance Adsorption Preventive Coating Composition

The biological substance adsorption preventive coating composition according to the invention is used to manufacture the biological substance related article according to the invention.

The biological substance adsorption preventive coating composition according to the invention includes (A) a copolymer, (B) a crosslinking agent reactive with an active hydrogen group (hereinafter may be called "crosslinking agent (B)"), and (C) a solvent. The components of the biological substance adsorption preventive coating composition according to the invention are described below.

2-1. Copolymer (A)

The copolymer (A) is a copolymer obtained by copolymerizing raw material monomers including a monomer A1 shown by the following general formula (1) and an active hydrogen group-containing monomer A2 (hereinafter may be called "monomer A2"). The active hydrogen group-containing monomer A2 includes an active hydrogen group and is copolymerisable with the monomer A1.

$$CH_2=CR^3COOR^1OR^2 \qquad (1)$$

wherein $R^1$ represents an alkylene group having 1 to 4 carbon atoms, $R^2$ represents an alkyl group having 1 to 4 carbon atoms, and $R^3$ represents a hydrogen atom or a methyl group.

The amount of the copolymer (A) in the biological substance adsorption preventive coating composition according to the invention excluding the solvent (C) is preferably 50 to 99 wt %, more preferably 70 to 97 wt %, and still more preferably 80 to 95 wt %. If the amount of the copolymer (A) is less than 50 wt %, the resulting coating may exhibit an insufficient adsorption preventive effect. If the amount of the copolymer (A) exceeds 99 wt %, the physical and chemical stability of the resulting coating may be insufficient.

2-1-1. Monomer A1

As examples of the monomer A1, alkoxyalkyl (meth)acrylates such as methoxymethyl acrylate, methoxyethyl acrylate, methoxypropyl acrylate, methoxybutyl acrylate, ethoxymethyl acrylate, ethoxyethyl acrylate, ethoxypropyl acrylate, ethoxybutyl acrylate, propoxymethyl acrylate, propoxyethyl acrylate, propoxypropyl acrylate, propoxybutyl acrylate, butoxymethyl acrylate, butoxyethyl acrylate, butoxypropyl acrylate, butoxybutyl acrylate, methoxymethyl methacrylate, methoxyethyl methacrylate, methoxypropyl methacrylate, methoxybutyl methacrylate, ethoxymethyl methacrylate, ethoxyethyl methacrylate, ethoxypropyl methacrylate, ethoxybutyl methacrylate, propoxymethyl methacrylate, propoxyethyl methacrylate, propoxypropyl methacrylate, propoxybutyl methacrylate, butoxymethyl methacrylate, butoxyethyl methacrylate, butoxypropyl methacrylate, and butoxybutyl methacrylate can be given. In particular, methoxyalkyl (meth)acrylates such as methoxymethyl acrylate, methoxyethyl acrylate, methoxypropyl acrylate, methoxybutyl acrylate, methoxymethyl methacrylate, methoxyethyl methacrylate, methoxypropyl methacrylate, and methoxybutyl methacrylate are preferable due to an excellent biological substance adsorption reduction effect, with 2-methoxyethyl acrylate and 2-methoxyethyl methacrylate being particularly preferable.

When the monomer A1 shown by the general formula (1) is an alkoxyalkyl (meth)acrylate, it is preferable that an alkoxyalkyl (meth)acrylate be included in the raw material monomers for manufacturing the copolymer (A) in an amount of 50 wt % or more from the viewpoint of biological substance adsorption.

The amount of the monomer A1 in the raw material monomers is preferably 50 to 99 wt %, more preferably 60 to 99 wt %, and still more preferably 70 to 98 wt %. If the amount of the copolymer (A) in the raw material monomers is less than 50 wt %, the resulting coating may exhibit an insufficient adsorption preventive effect. If the amount of the copolymer (A) in the raw material monomers exceeds 99 wt %, the physical and chemical stability of the resulting coating may be insufficient.

2-1-2. Monomer A2

As examples of the active hydrogen group of the monomer A2, a hydroxyl group, a carboxyl group, an amino group, a mercapto group, and the like can be given.

As examples of the monomer A2, carboxyl group-containing monomers such as hydroxyl group-containing (meth)acrylates such as hydroxyethyl acrylate, hydroxypropyl acrylate, hydroxyethyl methacrylate, hydroxypropyl methacrylate, glycerol monoacrylate, glycerol monomethacrylate, glycerol diacrylate, and glycerol dimethacrylate, polyethylene glycol mono(meth)acrylates such as diethylene glycol monoacrylate, triethylene glycol monoacrylate, triethylene glycol monoacrylate, tetraethylene glycol monoacrylate, hexaethylene glycol monoacrylate, octaethylene glycol monoacrylate, diethylene glycol monomethacrylate, triethylene glycol monomethacrylate, triethylene glycol monomethacrylate, tetraethylene glycol monomethacrylate, hexaethylene glycol monomethacrylate, and octaethylene glycol monomethacrylate, acrylic acid, methacrylic acid, maleic acid, and itaconic acid, amino group-containing monomers such as aminoethyl acrylate, aminoethyl methacrylate, aminopropyl acrylate, aminopropyl methacrylate, acrylamide, methacrylamide, aminopropylacrylamide, and aminopropylmethacrylamide, and the like can be given. In particular, hydroxyl group-containing (meth)acrylate such as hydroxyethyl acrylate, hydroxypropyl acrylate, hydroxyethyl methacrylate, hydroxypropyl methacrylate, glycerol monoacrylate, glycerol monomethacrylate, glycerol diacrylate, glycerol dimethacrylate, diethylene glycol monoacrylate, triethylene glycol monoacrylate, triethylene glycol monoacrylate, tetraethylene glycol monoacrylate, hexaethylene glycol monoacrylate, octaethyleneglycol monoacrylate, diethylene glycol monomethacrylate, triethylene glycol monomethacrylate, triethylene glycol monomethacrylate, tetraethylene glycol monomethacrylate, hexaethylene glycol monomethacrylate, and octaethyleneglycol monomethacrylate are preferable from the viewpoint of the biological substance adsorption reduction effect.

The strength and water resistance of the resulting coating are improved and adhesion of foreign matter is reduced by forming the copolymer (A) by using the active hydrogen group-containing monomer A2 together with the monomer A1, so that biological substance adsorption can be reduced.

The amount of the monomer A2 in the raw material monomers is preferably 1 to 50 wt %, more preferably 1 to 40 wt %, and still more preferably 2 to 30 wt %. If the amount of the monomer A2 in the raw material monomers is less than 1 wt %, the physical and chemical stability of the resulting coating becomes insufficient. If the amount of the monomer A2 in the raw material monomers exceeds 50 wt %, the adsorption preventive effect of the resulting coating becomes insufficient.

2-1-3. Another Monomer

The copolymer (A) may be produced by copolymerizing the raw material monomers including another monomer copolymerizable with the monomer A1 and/or the monomer A2 in addition to the monomer A1 shown by the general formula (1) and the active hydrogen group-containing monomer A2. As examples of another monomer, methyl acrylate, ethyl acrylate, propyl acrylate, butyl acrylate, pentyl acrylate, hexyl acrylate, octyl acrylate, glycidyl acrylate, furfuryl acrylate, tetrahydrofurfuryl acrylate, methyl methacrylate, ethyl methacrylate, propyl methacrylate, butyl methacrylate, pentyl methacrylate, hexyl methacrylate, octyl methacrylate, glycidyl methacrylate, furfuryl methacrylate, tetrahydrofurfuryl methacrylate, methyl vinyl ketone, vinyl acetate, and the like can be given.

The amount of another monomer in the raw material monomers may be appropriately selected insofar as the amounts of the monomer A1 and the monomer A2 are within the above-mentioned preferable range.

2-1-4. Method of Producing Copolymer (A)

The copolymer (A) may be a random copolymer, a block copolymer, or a graft copolymer.

A method of producing the copolymer (A) is not particularly limited. For example, a known method such as radical polymerization, ionic polymerization, or photopolymerization may be used. The temperature and the reaction time when producing the copolymer (A) may be appropriately determined depending on the types of monomers.

2-1-5. Molecular Weight of Copolymer (A)

The molecular weight of the copolymer (A) is not particularly limited. It is preferable that the copolymer (A) have a weight average molecular weight of 2,000 to 100,000 from the viewpoint of coatability, adhesion, and the like.

2-2. Crosslinking Agent (B) Reactive with Active Hydrogen Group

The crosslinking agent (B) reactive with an active hydrogen group can react with the active hydrogen group included in the copolymer (A). The active hydrogen group may be an active hydrogen group originating in the monomer A2. A specific type of active hydrogen group is as described in the section "2-1-2".

As examples of the crosslinking agent (B) reactive with an active hydrogen group, polyisocyanates such as hexamethylene diisocyanate, isophorone diisocyanate, 4,4'-methylenebis(cyclohexylisocyanate), tolylene diisocyanate, and methylenediphenyl diisocyanate, a block polyisocyanate obtained by reacting the above polyisocyanate with a block agent, trimethylol melamine, tributylol melamine, hexamethylol melamine, hexabutylol melamine, methylol urea resin, butylol urea resin, methylol benzoguanamine, butylol benzoguanamine, metal alkoxide and/or metal chelate of Al, Ti, or Zr, and the like can be given. In particular, polyisocyanates such as hexamethylene diisocyanate, isophorone diisocyanate, morpholine diisocyanate, 4,4'-methylenebis(cyclohexylisocyanate), tolylene diisocyanate, and methylenediphenyl diisocyanate are preferable due to the wide range of crosslinking temperature. It is particularly preferable to use non-aromatic polyisocyanates such as hexamethylene diisocyanate, isophorone diisocyanate, morpholine diisocyanate, and 4,4'-methylenebis(cyclohexylisocyanate) due to low biological substance (protein) adsorption.

Since the biological substance adsorption preventive coating composition according to the invention includes the crosslinking agent (B) reactive with an active hydrogen group, the strength and water resistance of the resulting coating are improved and adhesion of foreign matter is reduced by the reaction between the crosslinking agent (B) and the active hydrogen group in the copolymer (A), so that biological substance adsorption can be reduced.

The amount of the crosslinking agent (B) reactive with an active hydrogen group in the biological substance adsorption preventive coating composition according to the invention excluding the solvent (C) is preferably 1 to 50 wt %, more preferably 3 to 30 wt %, and still more preferably 5 to 20 wt %. If the amount of the crosslinking agent (B) reactive with an active hydrogen group is less than 1 wt %, the physical and chemical stability of the resulting coating becomes insufficient. If the amount of the crosslinking agent (B) exceeds 50 wt %, the adsorption preventive effect of the resulting coating becomes insufficient.

2-3. Solvent (C)

The solvent (C) is not particularly limited insofar as the copolymer (A) and the crosslinking agent (B) reactive with an active hydrogen group can be dispersed and/or dissolved and the crosslinking reaction is not hindered. The solvent (C) may be appropriately selected depending on the coating method such as spray coating, dip coating, spin coating, and electrodeposition coating.

As examples of the solvent (C), water, alcohols such as methanol, ethanol, propanol, isopropyl alcohol, n-butanol, iso-butanol, sec-butanol, and t-butanol, ethylene glycol, ethylene glycol derivatives such as ethylene glycol monomethyl ether, ethylene glycol monoethyl ether, ethylene glycol monopropyl ether, ethylene glycol monobutyl ether, ethylene glycol monoethyl ether acetate, diethylene glycol monomethyl ether, diethylene glycol monoethyl ether, diethylene glycol dimethyl ether, and diethylene glycol diethyl ether, propylene glycol, propylene glycol derivatives such as propylene glycol monomethyl ether, propylene glycol monoethyl ether, propylene glycol monopropyl ether, propylene glycol monobutyl ether, and propylene glycol monomethyl ether acetate, ketones such as acetone, methyl ethyl ketone, methyl isobutyl ketone, methyl amyl ketone, diisobutyl ketone, and cyclohexanone, esters such as ethyl acetate, butyl acetate, isobutyl acetate, ethyl lactate, and γ-butyrolactone, amides such as dimethylformamide, dimethylacetamide, and N-methylpyrrolidone, aromatics such as benzene, toluene, xylene, and mesitylene, aliphatic solvents such as hexane, octane, cyclohexane, and mineral spirits, and the like can be given.

A known curing catalyst appropriate for the crosslinking agent (B) used may be added in order to promote the reaction between the crosslinking agent (B) and an active hydrogen group. As examples of the curing catalyst, organometallic compounds such as organotin compounds, organotitanium compounds, organoaluminum compounds, and organozirconium compounds, basic materials such as primary amines, secondary amines, tertiary amines, and imidazole, salts such as p-toluenesulfonic acid-pyridinium salt, and the like can be given.

The amount of the solvent (C) in the biological substance adsorption preventive coating composition according to the invention is not particularly limited. The amount of the solvent (C) may be appropriately selected depending on the composition and the molecular weight of the copolymer (A), the type of the crosslinking agent (B) reactive with an active hydrogen group, the ratio of copolymer (A) to the crosslinking agent (B), the coating method, and the like.

2-4. Other Components

The biological substance adsorption preventive coating composition according to the invention may include a known additive such as a surfactant or an anti-foaming agent in order to improve the wettability with the material for the article to which the composition is applied and to prevent a defect in the coating.

2-5. Method of Using Biological Substance Adsorption Preventive Coating Composition (Method of Manufacturing Biological Substance Related Article)

A method of using a biological substance adsorption preventive coating composition according to the invention includes causing the biological substance adsorption preventive coating composition according to the invention to come in contact with the surface of an article and heating the composition to form a coating on the surface. The surface of the article may be heated after causing the biological substance adsorption preventive coating composition according to the invention to come in contact with the surface of the article, or the biological substance adsorption preventive coating composition according to the invention may be caused to come in contact with the surface of the article while heating the surface.

The method of causing the biological substance adsorption preventive coating composition according to the invention to come in contact with the surface of the article is not particularly limited. For example, application by spin coating, spraying by using a spray, deposition by vaporization, dipping, and electrodeposition coating can be given.

The temperature and the heating time when heating the surface of the article with which the biological substance adsorption preventive coating composition according to the invention is caused to come in contact are not particularly limited. The temperature and the heating time may be appropriately selected depending on the type of biological substance adsorption preventive coating composition used.

3. Example

The invention is described below in more detail based on examples. However, the invention is not limited to the following examples.

3-1. Synthesis Example 3-1-1. Synthesis Example 1 of Copolymer (A)

In a 200-ml flask, 17.6 g of 2-methoxyethyl acrylate and 2.4 g of glycerol monomethacrylate were dissolved in 60 g of dimethylformamide. Then, 100 mg of 2,2'-azobisisobutyronitrile was added to the mixture. After replacing the atmosphere of the reaction system with nitrogen, the components were polymerized at 70° C. for six hours. The resulting solution was diluted with 100 ml of acetone and poured into a large quantity of hexane. After removing the upper layer by decantation, the remaining viscous liquid was. purified twice by dissolving in 150 ml of acetone and re-precipitated with large quantity of hexane The purified product was dried at 50° C. overnight under vacuum to give 19.8 g of a colorless viscous liquid polymer 1 (copolymer (A)).

3-1-2. Synthesis Example 2 of Copolymer (A)

In a 200-ml flask, 16 g of 2-methoxyethyl acrylate and 4 g of hydroxyethyl methacrylate were dissolved in 60 g of dimethylformamide. Then, 100 mg of 2,2'-azobisisobutyronitrile was added to the mixture. After replacing the atmosphere of the reaction system with nitrogen, the components were polymerized at 70° C. for six hours. The resulting solution was diluted with 100 ml of acetone and poured into a large quantity of hexane. After removing the upper layer by decantation, the remaining viscous liquid was. purified twice by dissolving in 150 ml of acetone and re-precipitated with large quantity of hexane. The purified product was dried at 50° C. overnight under vacuum to give 19.3 g of a colorless viscous liquid polymer 2 (copolymer (A)).

3-1-3. Synthesis Example of Polymer of Comparative Example (Synthesis Example 3)

In a 200-ml flask, 20 g of 2-methoxyethyl acrylate was dissolved in 60 g of cyclohexanone. Then, 100 mg of 2,2'-azobisisobutyronitrile was added to the mixture. After replacing the atmosphere of the reaction system with nitrogen, the components were polymerized at 70° C. for six hours. The resulting solution was diluted with 100 ml of acetone and poured into a large quantity of hexane. After removing the upper layer by decantation, the remaining viscous liquid was purified twice by dissolving in 150 ml of acetone and re-precipitated with large quantity of hexane. The purified product was dried at 50° C. overnight under vacuum to give 18.3 g of a colorless viscous liquid polymer 3 (comparative example).

3-2. Evaluation of Nonspecific Protein Adsorption

An evaluation sample was folded so that the coated surface was positioned on the inner side, and was clipped at two locations from the outer side with a silicone rubber O-ring (inner diameter: 25 mm, thickness: 3.5 mm) placed therebetween to prepare a sample kit having a closed space with a volume of about 600 μL and a sample area of about 4.9 cm$^2$. Bovine serum albumin (BSA) was dissolved in a phosphoric acid buffer solution so that the concentration was 1 wt %, and the mixture was filtered through a 0.22-μm filter to obtain a BSA solution. Then, two 27-gauge injection needles were inserted into the O-ring of the sample kit. One of the holes was used as an air hole. An injection syringe (1 cc) was connected with the other hole, and 600 μL of the BSA solution was injected. After allowing the sample kit to stand at room temperature for two hours, the BSA solution was removed by using the injection syringe. The clip was then removed to disassemble the sample kit. 1 mL of a cleaning solution (10 mM HEPES pH=7.4/0.005% Tween 20) was dropped onto each evaluation sample wafer after disassembly by using a pipette and then washed away. This operation was repeated five times.

The evaluation sample wafer was then dried by rotating the evaluation sample wafer using a spin coater. Two evaluation sample wafers were again placed so that the evaluation sample wafers faced each other, and clipped at two locations from the outer side with a new silicone rubber O-ring placed therebetween to prepare a sample kit. Then, two 27-gauge injection needles were inserted into the O-ring of the sample kit. One of the holes was used as an air hole. An injection syringe (1 cc) was connected with the other hole, and 600 μL of a separation liquid (2% sodium dodecyl sulfate aqueous solution) was injected. After allowing the sample kit to stand at room temperature for 10 minutes, the separation liquid was entirely removed by using the syringe. A solution was prepared by dissolving 81 mg of dithiothreitol in 1 mL of a Laemni sample buffer (manufactured by Bio-Rad). After mixing 100 μL of the resulting solution with 100 μL of the separation liquid which had been removed, the mixture was heated at 99° C. for two minutes to obtain an SDS-PAGE (dodecyl sodium sulphate-polyacrylamide gel electrophoresis) sample. After performing SDS-PAGE, silver staining was carried out. The peak width and the density at near about 66 kDa which is the band specific to BSA were measured by using a densitometer GS-800 (manufactured by Bio-Rad). The adsorption amount of protein of the sample was determined by using BSA at a known concentration caused to flow through another lane by using the identical SDS-PAGE gel as a reference. The determined adsorption amount of protein was used as the index of the nonspecific protein adsorption. Specifically, the larger the adsorption amount of protein, the higher the nonspecific protein adsorption.

3-3. Experimental Example and Comparative Example

3-3-1. Experimental Example 1

10 parts by weight of the polymer 1 obtained in Synthesis Example 1 and 1 part by weight of isophorone diisocyanate were dissolved in 200 parts by weight of cyclohexanone to obtain a biological substance adsorption preventive coating composition 1. The composition 1 was applied to a glass plate by using a spin coater at 300 rpm for five seconds and at 1000 rpm for 20 seconds. The applied composition 1 was heated at 150° C. for 10 minutes to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25° C. for 10 hours. As a result, the sample did not show a change such as coating separation or swelling. The nonspecific protein adsorption of the sample was then evaluated.

3-3-2. Experimental Example 2

10 parts by weight of the polymer 1 obtained in Synthesis Example 1, 1 part by weight of Cymel 303 (manufactured by Mitsui-Cytec, Ltd.), and 0.01 part by weight of p-toluenesulfonic acid-triethylamine were dissolved in 200 parts by weight of cyclohexanone to obtain a biological substance adsorption preventive coating composition 2. The composition 2 was applied to a 3 cm-square glass plate by using a spin coater at 300 rpm for five seconds and at 1000 rpm for 20 seconds. The applied composition 2 was heated at 150° C. for 10 minutes to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25° C. for 10 hours. As a result, the sample did not show a change such as coating separation or swelling. The nonspecific protein adsorption of the sample was then evaluated in the same manner as in Experimental Example 1.

3-3-3. Experimental Example 3

10 parts by weight of the polymer 2 obtained in Synthesis Example 2 and 1 part by weight of isophorone diisocyanate were dissolved in 200 parts by weight of cyclohexanone to obtain a biological substance adsorption preventive coating composition 3. The composition 3 was applied to a 3 cm-square glass plate by using a spin coater at 300 rpm for five seconds and at 1000 rpm for 20 seconds. The applied composition 3 was heated at 150° C. for 10 minutes to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25° C. for 10 hours. As a result, the sample did not show a change such as coating separation or swelling. The nonspecific protein adsorption of the sample was then evaluated in the same manner as in Experimental Example 1.

3-3-4. Comparative Example 1

10 parts by weight of the polymer 3 obtained in Synthesis Example 3 was dissolved in 200 parts by weight of cyclohexanone to obtain a coating composition 4. The composition 4 was applied to a 3 cm-square glass plate by using a spin coater at 300 rpm for five seconds and at 1000 rpm for 20 seconds. The applied composition 4 was heated at 150° C. for 10 minutes to obtain an evaluation sample on which a coating was formed. The resulting coating exhibited tackiness so that foreign matter such as dust easily adhered. When the resulting coating was rubbed with the fingernail, the resulting coating was easily removed due to insufficient strength. The sample was then immersed in pure water at 25° C. for 10 hours. As a result, whitening of the film was observed. The nonspecific protein adsorption of the sample was then evaluated in the same manner as in Experimental Example 1.

3-3-5. Comparative Example 2

10 parts by weight of the polymer 1 obtained in Synthesis Example 1 was dissolved in 200 parts by weight of cyclohexanone to obtain a coating composition 5. The composition 5 was applied to a 3 cm-square glass plate by using a spin coater at 300 rpm for five seconds and at 1000 rpm for 20 seconds. The applied composition 5 was heated at 150° C. for 10 minutes to obtain an evaluation sample on which a coating was formed. The resulting coating exhibited tackiness so that foreign matter such as dust easily adhered. When the resulting coating was rubbed with the fingernail, the resulting coating was easily removed due to insufficient strength. The sample was then immersed in pure water at 25° C. for 10 hours. As a result, swelling and whitening of the coating were observed. The nonspecific protein adsorption of the sample was then evaluated in the same manner as in Experimental Example 1. However, since the coating had swelled to a large extent, the adsorption could not be evaluated.

3-3-6. Experimental Example 4

The surface of a 3.5 cm-square polyethylene sheet was hydrophilized by subjecting the surface of the polyethylene sheet to a corona discharge treatment. A solution prepared by adding 0.01 part by weight of dibutyltin dilaurate as a catalyst to the biological substance adsorption preventive coating composition 1 was applied to the surface of the polyethylene sheet by dip coating, and heated at 80° C. for three hours to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25°

C. for 10 hours. As a result, the sample did not show a change such as coating separation or swelling. The nonspecific protein adsorption of the sample was then evaluated in the same manner as in Experimental Example 1.

3-3-7. Experimental Example 5

The biological substance adsorption preventive coating composition 1 obtained in Experimental Example 1 was applied to a 3.5 cm-square polystyrene sheet (304SS plate) by dip coating, and heated at 150° C. for 10 minutes to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25° C. for 10 hours. As a result, the sample did not show a change such as coating separation or swelling. The nonspecific protein adsorption of the sample was then evaluated in the same manner as in Experimental Example 1.

3-3-8. Experimental Example 6

The surface of a 3.5 cm-square silicon wafer was hydrophilized by subjecting the surface of the silicon wafer to a plasma discharge treatment. The biological substance adsorption preventive coating composition 1 obtained in Experimental Example 1 was applied to the silicon wafer by dip coating, and heated at 150° C. for 10 minutes to obtain an evaluation sample on which a coating was formed. Adhesion of foreign matter such as dust was not observed on the resulting coating. When the resulting coating was rubbed with the fingernail, the resulting coating did not show a change in appearance such as coating removal due to high strength. The sample was then immersed in pure water at 25° C. for 10 hours. As a result, the sample did not show a change such as coating separation or swelling. The nonspecific protein adsorption of the sample was then evaluated in the same manner as in Experimental Example 1.

3-3-9. Comparative Examples 3, 4, 5 and 6

The nonspecific protein adsorption was evaluated in the same manner as in Experimental Example 1 using a glass plate (Comparative Example 3), a polyethylene sheet (Comparative Example 4), a 304SS plate (polystyrene sheet) (Comparative Example 5), and a silicon wafer (Comparative Example 6) without forming a coating.

Table 1 shows the evaluation results obtained in Experimental Examples 1 to 6 and Comparative Examples 1 to 6.

TABLE 1

| | Composition | Material for surface of article | Amount of protein adsorption (μg/cm$^2$) |
|---|---|---|---|
| Experimental Example 1 | 1 | Glass | 0.3 |
| Experimental Example 2 | 2 | Glass | 7.3 |
| Experimental Example 3 | 3 | Glass | 1.2 |
| Experimental Example 4 | 1 | Polyethylene | 0.8 |
| Experimental Example 5 | 1 | Polystyrene | 0.7 |
| Experimental Example 6 | 1 | Silicon | 0.2 |
| Comparative Example 1 | 4 | Glass | 9.4 |
| Comparative Example 2 | 5 | Glass | Could not be evaluated |
| Comparative Example 3 | None | Glass | 32 |
| Comparative Example 4 | None | Polyethylene | 122 |
| Comparative Example 5 | None | Polystyrene | 78 |
| Comparative Example 6 | None | Silicon | 25 |

As is clear from the results shown in Table 1, protein adsorption could be significantly reduced by the coatings formed in Experimental Examples 1 to 6 in comparison with the case where the coating was not formed (Comparative Examples 3 to 6).

The coatings formed in Experimental Examples 1 to 6 are obtained by applying the biological substance adsorption preventive coating composition including the copolymer (A) obtained by copolymerizing the raw material monomers including the monomer A1 shown by the general formula (1) and the active hydrogen group-containing monomer A2, the crosslinking agent (B) reactive with an active hydrogen group, and the solvent (C), and heating the applied composition. According to the results of Experimental Examples 1 to 6, it was confirmed that the coating has low nonspecific protein adsorption, allows a contaminant to adhere to only a small extent, is inexpensive, and exhibits excellent strength and water resistance.

On the other hand, since the coating of Comparative Example 1 is formed by using the composition containing the polymer 3 polymerized without using the monomer A2, the coating of Comparative Example 1 exhibits tackiness, so that foreign matter such as dust easily adheres, and exhibits inferior strength and water resistance. Since the coating of Comparative Example 2 is formed by using the composition which does not contain the crosslinking agent (B), the coating of Comparative Example 2 exhibits tackiness, so that foreign matter such as dust easily adheres, and exhibits inferior strength and water resistance.

The specific embodiments of the present invention described in detail above are given by way of example only, and it is apparent that those skilled in the art will readily make many modifications in the embodiments without departing from the novel teachings and advantages of this invention. Therefore, all such modifications are intended to be included within scope of this invention.

What is claimed is:

1. A biological substance adsorption preventive coating composition comprising:
    (A) a copolymer obtained by copolymerizing raw material monomers including a monomer A1 shown by the following general formula (1) and an active hydrogen group-containing monomer A2, wherein the amount of monomer A1 in the raw material monomers is from 50 to 99 wt % and the amount of the monomer A2 in the raw material monomer is from 1 to 50 wt %

$$CH_2=CR^3COOR^1OR^2 \quad (1)$$

wherein R$^1$ represents an alkylene group having 1 to 4 carbon atoms, R$^2$ represents an alkyl group having 1 to 4 carbon atoms, and R$^3$ represents a hydrogen atom or a methyl group;
    (B) a crosslinking agent reactive with an active hydrogen group; and
    (C) a solvent.

2. The biological substance adsorption preventive coating composition as defined in claim 1, wherein the monomer A1 is a methoxyalkyl (meth)acrylate.

3. The biological substance adsorption preventive coating composition as defined in claim 1, wherein the active hydrogen group of the monomer A2 is a hydroxyl group, a carboxyl group, an amino group, or a mercapto group.

4. The biological substance adsorption preventive coating composition as defined in claim 1, wherein the monomer A2 is a hydroxyl group-containing (meth)acrylate.

5. The biological substance adsorption preventive coating composition as defined in claim 1, wherein the crosslinking agent (B) is a non-aromatic polyisocyanate.

6. The biological substance adsorption preventative coating composition as defined in claim 1, wherein the amount of monomer A1 in the raw material monomers is from 60 to 99 wt %.

7. The biological substance adsorption preventative coating composition as defined in claim 1, wherein the amount of monomer A1 in the raw material monomers is from 77 to 98 wt %.

8. The biological substance adsorption preventative coating composition as defined in claim 1, wherein the amount of the monomer A2 in the raw material monomer is from 1 to 40 wt %.

9. The biological substance adsorption preventative coating composition as defined in claim 1, wherein the amount of the monomer A2 in the raw material monomer is from 2 to 30 wt %.

\* \* \* \* \*